United States Patent [19]

Santa et al.

[11] Patent Number: 5,006,629

[45] Date of Patent: Apr. 9, 1991

[54] WHOLLY AROMATIC POLYAMIDE COPOLYMER

[75] Inventors: Toshihiro Santa; Tsutomu Kiriyama, both of Matsuyama, Japan

[73] Assignee: Teijin Limited, Osaka, Japan

[21] Appl. No.: 428,898

[22] Filed: Oct. 30, 1989

[30] Foreign Application Priority Data

Nov. 1, 1988 [JP] Japan .................................. 63-274400
Jan. 23, 1989 [JP] Japan .................................. 1-11862
Mar. 3, 1989 [JP] Japan .................................. 1-50029

[51] Int. Cl.$^5$ ............................................. C08G 69/32
[52] U.S. Cl. ........................ 528/183; 528/340; 528/348; 528/349
[58] Field of Search ................ 528/183, 340, 348, 349

[56] References Cited

U.S. PATENT DOCUMENTS 4,847,354  7/1989  Keil et al. .............................. 528/340

OTHER PUBLICATIONS

Derwent Abstract: DE 505,904, 8-21-86.

Primary Examiner—Harold D. Anderson
Attorney, Agent, or Firm—Burgess, Ryan & Wayne

[57] ABSTRACT

A wholly aromatic polyamide copolymer having excellent heat, flame and chemical resistances, solubility in organic solvents and shaping property and useful for shaped article having a high mechanical strength and modulus of elasticity, comprising the repeating units of the formulae:

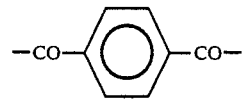

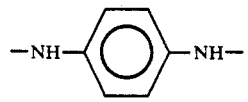

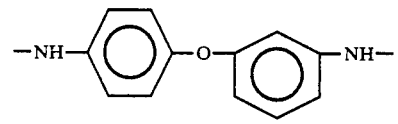

and at least one member selected from

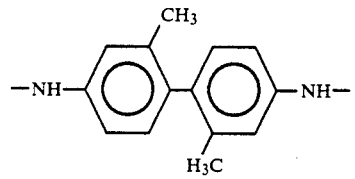

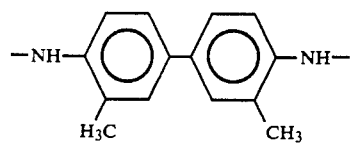

and

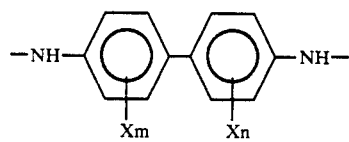

wherein X=a halogen atom, n, or m=1 to 4 and n+m=1 to 8.

10 Claims, 3 Drawing Sheets

WHOLLY AROMATIC POLYAMIDE COPOLYMER

BACKGROUND OF THE INVENTION

(1) Field of the Invention

The present invention relates to a wholly aromatic polyamide copolymer. More particularly, the present invention relates to a wholly aromatic polyamide copolymer containing, as a portion of the aromatic diamine moiety, a methyl- or chloro-benzidine structure and having an excellent heat, flame and chemical resistance, solubility in organic solvents and shaping property, and useful for shaped articles having a superior mechanical strength and modulus of elasticity.

(2) Description of the Related Arts

It is known that wholly aromatic polyamide (aramid) resins have a superior mechanical strength and modulus of elasticity and an excellent heat resistance, and thus are useful for fibers, films and other shaped articles. Especially, a para type aramide resin, namely poly-p-phenylene terephthalamide (PPTA) resin, is a typical aramide resin useful for industrial materials and protecting devices in which the specific properties of the aramide resins are effectively utilized. Nevertheless, the PPTA resin poses problems in the polymerization thereof and has an unsatisfactory spinnability and formability due to a high rigidity or stiffness of the PPTA molecules. For example, in the production process of the PPTA resin, hexamethylphosphortriamide, which has a high toxity for the human body and other life-forms, must be used as a polymerization medium. Also, in the production of PPTA fibers, films or other shaped articles, a concentrated sulfuric acid must be employed to prepare a liquid crystalline dope solution of the PPTA resin and a liquid crystal spinning or shaping procedure must be carried out. After this procedure, the sulfuric acid in the resultant product must be neutralized with a large amount of a neutralizing agent. Also, the resultant product (fibers or other shaped articles) contains inorganic ions derived from the sulfuric acid and the the neutralizing agent, and these inorganic ions cause a lowering of the quality of the product. Further, removal of the inorganic ions raises the cost of the resultant product.

To eliminate the above-mentioned disadvantages, attempts have been made to employ a popular organic polar solvent for the dope solution of the PPTA resin, to prepare an isotropic dope solution and to simplify the spinning or shaping procedure. Particularly, Japanese Unexamined Patent Publication Nos. 51-76,386, 51-134,743, 51-136,916, 61-252,229, 62-27,431, 62-225,530, 62-177,022 and 62-177,023 disclose methods for enhancing the solubility of the aramide resins, to introduce ether bonds into the aramide molecules by copolymerization.

In one such attempt, wholly aromatic polyamide copolymers prepared by the copolymerization of an aromatic diamine component comprising p-phenylene diamine (PPDA) and 3,4'-diaminodiphenylether (3,4'-DAPE) with an aromatic dicarboxylic component comprising terephthalic acid, have a high mechanical strength, modulus of rigidity and chemical resistance, and can be prepared by using a popular polar solvent, for example, N-methylpyrrolidone, as the polymerization medium. Also, the resultant polymer solution can be directly utilized as a dope solution for spinning or other shaping processes. Therefore, the above-mentioned ether-bond-containing wholly aromatic polyamide copolymers provide a greatly improved process for producing shaped aramide resin-articles.

Nevertheless, the introduction of the ether bonds usually causes the resultant wholly aromatic polyamide copolymer resins to exhibit an unsatisfactory heat resistance and modulus of rigidity, which can be assumed from the primary structure of the resultant aramide copolymer molecules.

Accordingly, there is still a strong demand for a new type of wholly aromatic polyamide resins having a satisfactory mechanical strength, heat resistance and modulus of rigidity, and capable of being produced by an easy polymerization process and of being shaped by an easy shaping process.

SUMMARY OF THE INVENTION

An object of the present invention is to provide a wholly aromatic polyamide copolymer soluble in an organic solvent having less toxity to the human body and other life-forms, and having a spinning and shaping stability.

Another object of the present invention is to provide a wholly aromatic polyamide copolymer having a high mechanical strength and heat resistance, and a satisfactory modulus of rigidity.

The above-mentioned objects can be attained by the wholly aromatic polyamide copolymer of the present invention which comprises:

an aromatic dicarbonyl moiety consisting of repeating units of the formula:

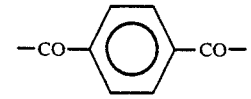

and an aromatic diamine moiety comprising:
(A) at least one type of repeating units selected from those (A-1), (A-2) and (A-3) of the formulae:

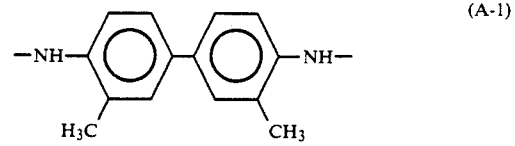

(A-1)

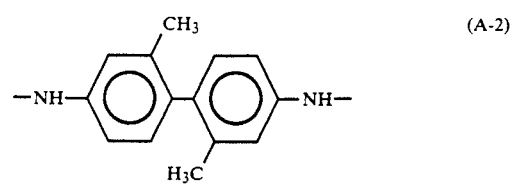

(A-2)

and

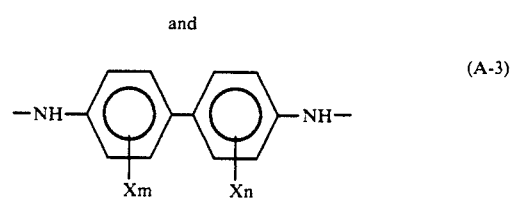

(A-3)

wherein X represents a halogen atom, m and n represent, respectively and independently from each other, zero or an integer of 1 to 4, and the sum of m and n is 1 to 8, (B) repeating units of the formula:

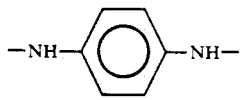

and (C) repeating units of the formula:

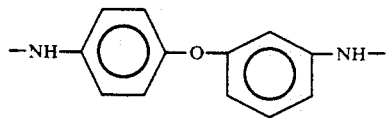

DESCRIPTION OF THE PREFERRED EMBODIMENTS

Figure 1:
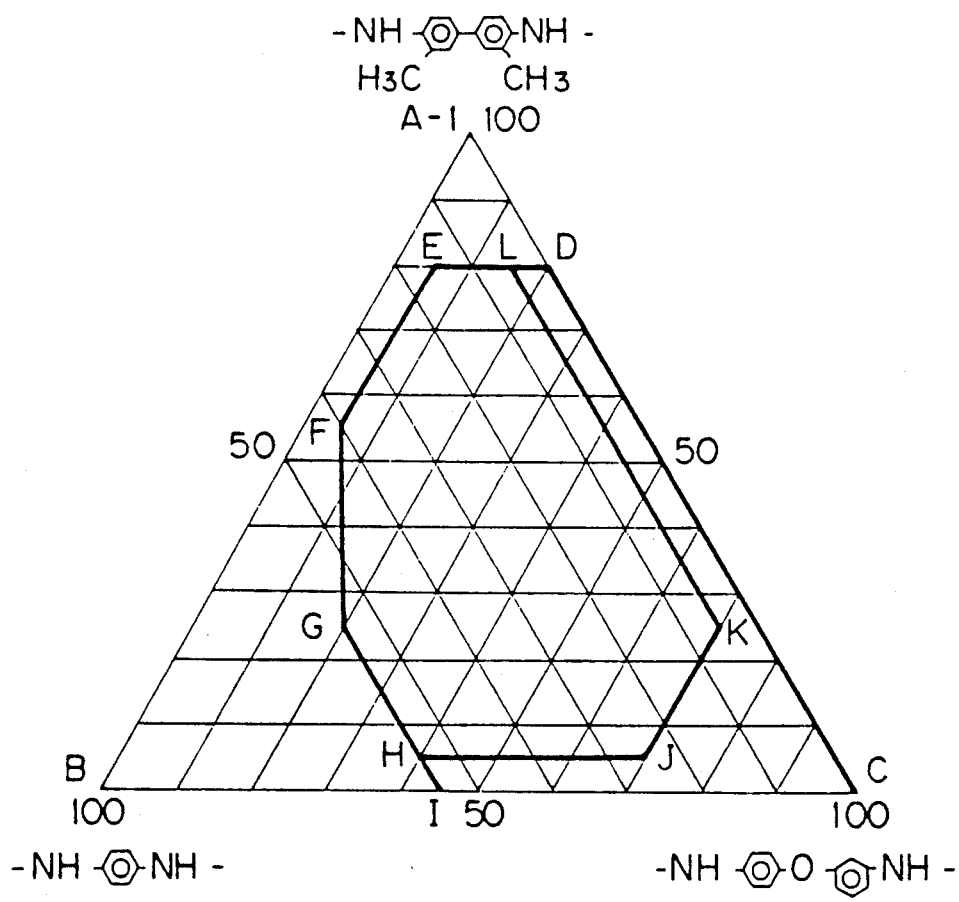
FIG. 1 is an triangular coordinate diagram showing preferable molar proportions of three different types of repeating units in the aromatic diamine moiety in an embodiment of the wholly aromatic polyamide copolymer of the present invention.

The wholly aromatic polyamide copolymer of the present invention is based on the finding that the mechanical strength, chemical resistance, and heat resistance of the conventional PPTA copolymer comprising a polymerization product of an aromatic dicarboxylic acid component comprising terephthalic acid chloride (TPC) with an aromatic diamine component comprising p-phenylenediamine (PPDA) and 3,4'-diaminodiphenyl ether (3,4'-DAPE), and having a high solubility in a widely-used polymerization medium, can be significantly enhanced by copolymerizing, as a third aromatic diamine ingredient, a member selected from the group consisting of o-tolidine (3,3'-dimethylbenzidine), m-tolidine (2,2'-dimethylbenzidine) and hologenated benzidines, which have a rigid molecular structure, with the abovementioned components.

In the copolymer of the present invention, the aromatic dicarboxylic acid moiety comprises the repeating units of the formula:

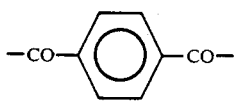

which are derived from terephthalic acid chloride (TPC).

The aromatic diamine moiety in the copolymer of the present invention comprises:

(A) a type of repeating units selected from those (A-1), (A-2) and (A-3) of the formulae:

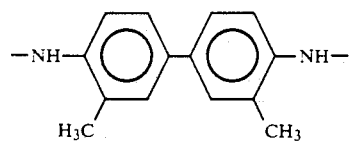 (A-1)

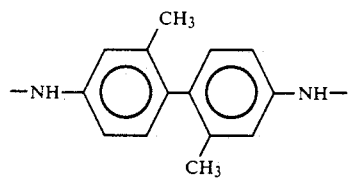 (A-2)

and

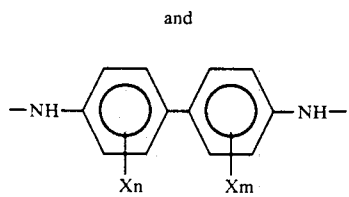 (A-3)

wherein X represents a halogen atom, preferably a chlorine or bromine atom, and m and n represent, respectively and independently from each other, zero or an integer of 1 to 4, preferably 1 to 2, and the sum of m and n is 1 to 8, preferably 2 to 4.

(B) repeating units of the formula

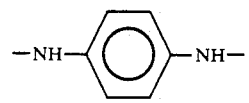

which are derived from p-phenylene diamine, and (C) repeating units of the formula

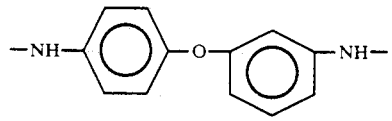

which are derived from 3,4'-DAPE.

In the copolymer of the present invention, the total equivalent number of the carbonyl radicals (—CO—) in the aromatic dicarboxylic acid moiety is substantially equal to the total equivalent number of the secondary amine radicals (—NH—) in the aromatic diamine moiety, so that substantially all of the carbonyl radicals and the secondary amine radicals are formed into an amide group —CONH—.

There is no specific restriction on the molar proportions of the repeating units (A), (B) and (C) in the aromatic diamine moiety.

Where the aromatic diamine moiety consists of the repeating units (A-1), (B) and (C), and when indicated in a triangular coordinate system as shown in FIG. 1, the molar proportions of the repeating units (A-1), (B) and (C) are preferably on or within a polygonal diagram defined by the coordinates CDEFGHI, which are defined as follows.

| Coordinate | Molar % of repeating units | | |
|---|---|---|---|
| | (A-1) | (B) | (C) |
| C | 0 | 0 | 100 |
| D | 80 | 0 | 20 |
| E | 80 | 15 | 5 |
| F | 55 | 40 | 5 |
| G | 25 | 55 | 20 |
| H | 5 | 55 | 40 |
| I | 0 | 55 | 45 |

When the molar proportions of the repeating units (A-1), (B) and (C) are on or within the polygonal diagram CDEFGHI indicated in FIG. 1, the resultant wholly aromatic polyamide copolymer of the present invention exhibits an enhanced solubility in widely-used polymerization mediums, for example, N-methyl pyrrolidone, and a high degree of polymerization, and shaped articles made from the copolymer exhibit an excellent mechanical strength and chemical and heat resistances, and thus are useful for various industrial applications.

More preferably, in the triangular coordinate system indicated in FIG. 1, the molar proportions of the repeating units (A-1), (B) and (C) are on or within a polygonal diagram defined by the coordinates EFGHJKL, which are defined as follows.

| Coordinate | Molar % of repeating units | | |
|---|---|---|---|
| | (A-1) | (B) | (C) |
| E | 80 | 15 | 5 |
| F | 55 | 40 | 5 |
| G | 25 | 55 | 20 |
| H | 5 | 55 | 40 |
| J | 5 | 25 | 70 |
| K | 25 | 5 | 70 |
| L | 80 | 5 | 15 |

The molar proportions of the repeating units (A-1), (B) and (C) on or within the polygonal diagram EFGHJKL results in a very high solubility of the resultant copolymer in the widely-used polymerization mediums, and in an excellent mechanical strength of the resultant shaped articles produced from the copolymer.

Figure 2:
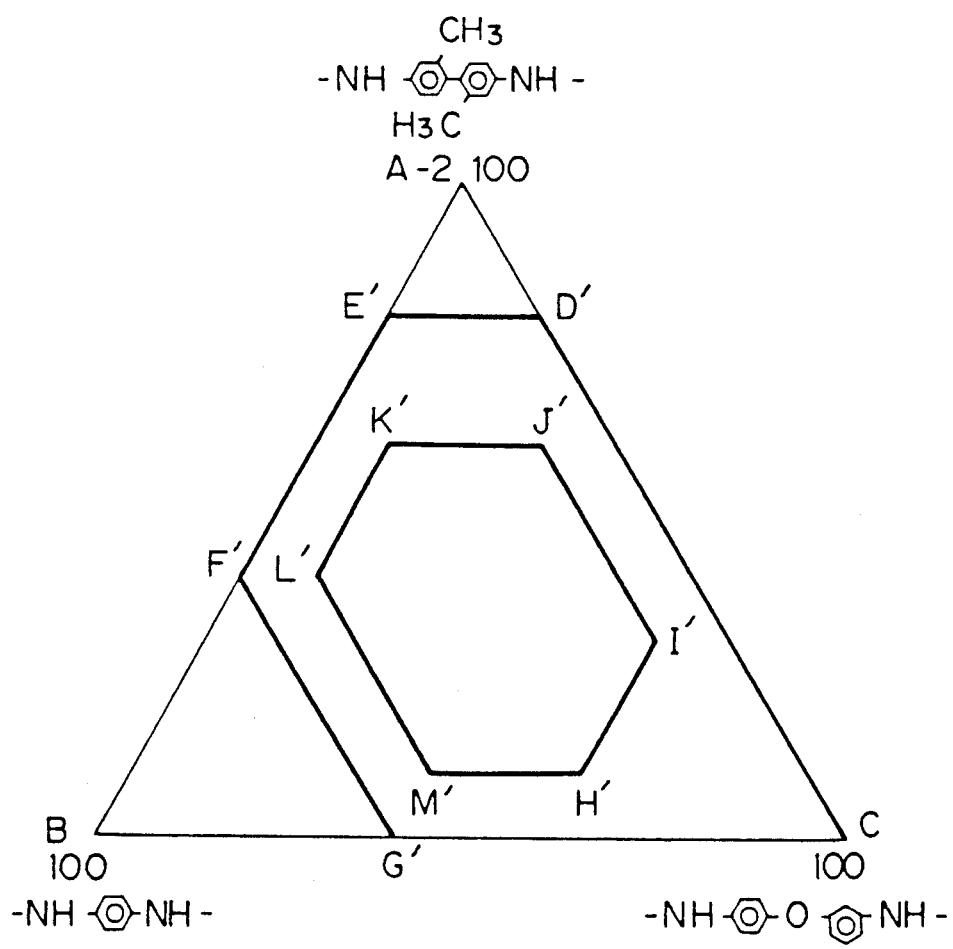
FIG. 2 is an triangular coordinate diagram showing preferable molar proportions of three different types of repeating units in the aromatic diamine moiety in another embodiment of the wholly aromatic polyamide copolymer of the present invention; and, FIG. 3 is a triangular coordinate diagram showing preferable molar proportions of three different types of repeating units in the aromatic diamine moiety in still another embodiment of the wholly aromatic polyamide copolymer of the present invention.

Also, where the aromatic diamine moiety comprises the repeating units (A-2), (B) and (C), the molar proportions of the repeating units (A-2), (B) and (C) are preferably on or within a polygonal diagram CD'E'F'G' in the triangular coordinate system as shown in FIG. 2. The coordinates CD'E'F'G' are defined as follows.

| Coordinate | Molar % of repeating units | | |
|---|---|---|---|
| | (A-2) | (B) | (C) |
| C | 0 | 0 | 100 |
| D' | 80 | 0 | 20 |
| E' | 80 | 20 | 0 |
| F' | 40 | 60 | 0 |
| G' | 0 | 60 | 40 |

The resultant copolymer in which the repeating units (A-2), (B) and (C) in the aromatic diamine moiety have the above-defined molar proportions, exhibits an enhanced solubility in widely-used polymerization mediums, and the resultant shaped articles from the copolymer exhibit a high mechanical strength and chemical and heat resistances.

More preferably, the molar proportions of the repeating units (A-2), (B) and (C) in the aromatic diamine moiety are on or within a polygonal diagram defined by the coordinates H'I'J'K'L'M' as shown in FIG. 2. These coordinates are defined below.

| Coordinate | Molar % of repeating units | | |
|---|---|---|---|
| | (A-2) | (B) | (C) |
| H' | 10 | 30 | 60 |
| I' | 30 | 10 | 60 |
| J' | 60 | 10 | 30 |
| K' | 60 | 30 | 10 |
| L' | 40 | 50 | 10 |
| M' | 10 | 50 | 40 |

The above-defined molar proportions of the repeating units (A-2), (B) and (C) cause the resultant copolymer to exhibit a very high solubility in widely-used polymerization mediums, and the resultant shaped articles from the copolymer exhibit an excellent mechanical strength and chemical and heat resistances.

Figure 3:
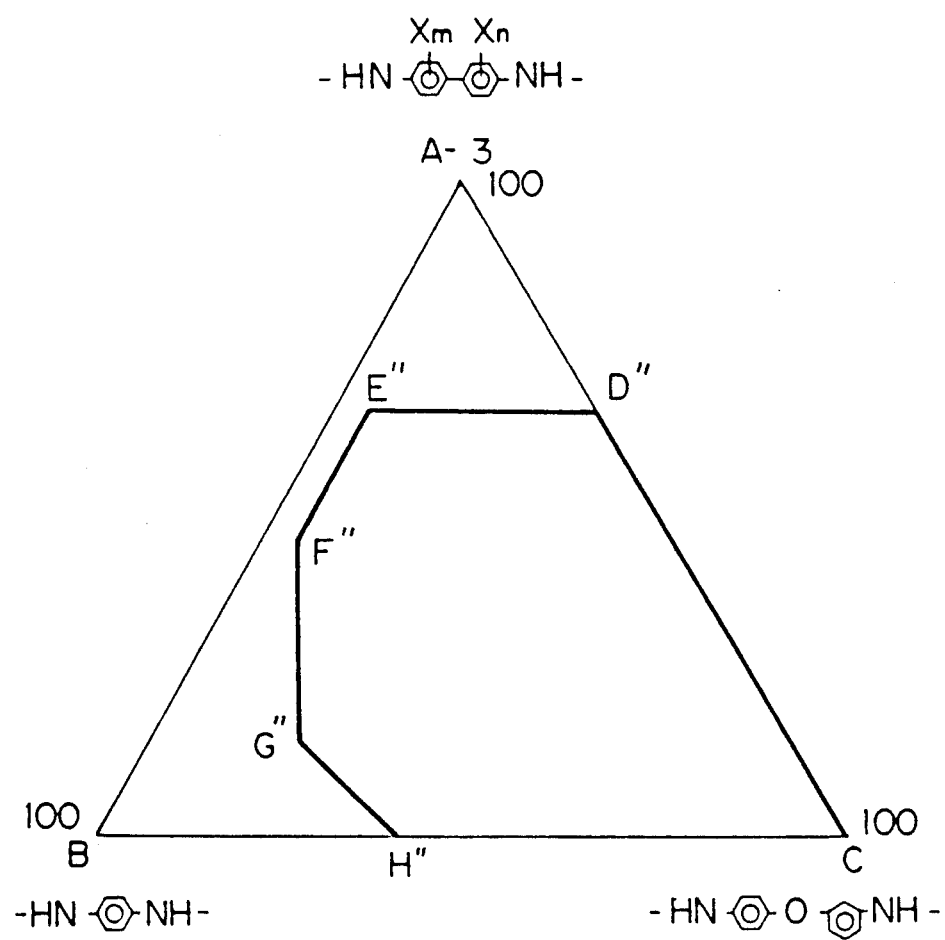

Furthermore, where the aromatic diamine moiety comprises the repeating units (A-3), (B) and (C), the molar proportions of the repeating units (A-3), (B) and (C) are preferably on or within a polygonal diagram defined by the coordinates C D"E"F"G"H" as shown in FIG. 3. These coordinates are defined as follows.

| Coordinate | Molar % of repeating units | | |
|---|---|---|---|
| | (A-3) | (B) | (C) |
| C | 0 | 0 | 100 |
| D" | 65 | 0 | 35 |
| E" | 65 | 30 | 5 |
| F" | 45 | 50 | 5 |
| G" | 15 | 65 | 20 |
| H" | 0 | 60 | 40 |

The molecular proportions of the repeating units (A-3), (B), and (C) as indicated above cause the resultant copolymer to exhibit a very high solubility in widely-used polymerization mediums, and the resultant shaped articles from the copolymer to exhibit an excellent mechanical strength and chemical and heat resistances.

Especially, when the content of halogen in the copolymer is 0.5% by weight or more, preferably 1.0% by weight or more, the copolymer exhibits an excellent flame resistance or flame retardant property.

The wholly aromatic polyamide copolymer of the present invention is prepared by copolymerizing an aromatic dicarboxylic component comprising terephthalic acid chloride (TPC) with an aromatic diamine component comprising p-phenylene diamine (PPDA), 3,4'-diaminodiphenylether (3,4'-DAPE) and a member selected from dimethyl benzidine compounds and chlorobenzidine compound from which the repeating units (A-1), (A-2) or (A-3) are derived in widely-used polymerization polar mediums by a conventional melt polymerization method, solid phase polymerization method, interface polymerization method or solution polymerization method.

The halogenated benzidine compound usable for the present invention is preferably selected from 3-chlorobenzidine, 3-bromobenzidine, 3,3'-dichlorobenzidine, 3,3'-dibromobenzidine, 3,3'-difluorobenzidine, 2,2'-dichlorobenzidine, 2,2-dibromobenzidine, 2,2'-difluorobenzidine, 3,3',5,5'-tetrafluorobenzidine, 3,3',5,5'-tetrabromobenzidine, and 3,3',5,5'-tetrachlorobenzidine.

The most preferable halogenated benzidine is 3,3'-dichlorobenzidine.

The widely-used polymerization mediums preferably comprise, as a principal component, at least one member selected from, for example, dimethyl formamide, dimethyl acetamide, N-methylpyrrolidone, N-methyl caprolactam, dimethylsulfone or tetramethyl urea.

In the polymerization process, to increase the dissolving activity of the polymerization medium for the resultant polyamide copolymer, before, during or after the copolymerization is carried out, an inorganic salt may be added in an amount of less than 10% by weight to the polymerization medium.

The inorganic salt can be selected from those usable for the above-mentioned purpose, for example, lithium chloride and calcium chloride.

As mentioned above, the aromatic dicarboxylic acid component is reacted in a equivalent molar ratio of the —CO—radicals to the —NH—radicals of substantially 1:1, but at least one member of the polymerization components may be employed in an excessive amount to control the degree of polymerization of the resultant copolymer. Also, a monofunctional acid compound or amino compound may be added, as a terminating agent, to the copolymerization system, to control the degree of polymerization of the resultant copolymer.

Also, the copolymerization system may contain an aliphatic or aromatic amine compound or quaternary ammonium compound to catch and neutralize an acid substance, for example, hydrogen chloride, produced as a by-product of the polymerization.

After the polymerization procedure is completed, if necessary, the polymerization mixture is neutralized by adding a basic inorganic substance, for example, sodium hydroxide, potassium hydroxide, calcium hydroxide and calcium oxide, to the polymerization mixture.

In the polymerization procedures for the polyamide copolymer of the present invention, the concentration of the resultant copolymer in the polymerization medium is important, to ensure that the resultant copolymer resin has a uniform degree of polymerization. That is, the concentration of the resultant copolymer in the polymerization medium is preferably 20% by weight or less, more preferably, 10% by weight or less, which effectively stabilizes the polymerization system and produces a polymer having a uniform quality.

Also, the copolymer of the present invention preferably exhibits an intrinsic viscosity of 1.5 to 10, more preferably 2 to 8, determined in a concentration of 0.5 g/100 ml in a solvent consisting of a 98% by weight concentrated sulfuric acid at a temperature of 30° C.

There is no specific restriction on the polymerization conditions, and usually, since the reaction of the aromatic dicarboxylic acid component, for example, aromatic dicarboxylic acid halide, with the aromatic diamine component is carried out at a high reaction rate, the polymerization system is preferably maintained at a polymerization temperature of −25° C. to 100° C., more preferably −10° C. to 80° C. Note, the polymerization system must be protected from undesirable contamination with water or other substances which may hinder the polymerization.

Since the copolymer of the present invention has a very high solubility in the polymerization medium, the polymerization can be stably carried out without deposition of the resultant copolymer from the polymerization medium.

The resultant polymerization product, namely an aromatic polyamide copolymer resin, may be deposited in a pulp-like form by mixing the resultant polymerization system with a non-solvent, for example, methyl alcohol or water. The pulp-like copolymer is separated and collected from the polymerization system. The collected resin can be used for forming shaped articles by conversion to a copolymer solution in a solvent, shaping the dope solution into a desired form, and solidifying the shaped dope solution by drying or coagulating.

Preferably, the resultant polymerization solution containing the resultant copolymer is directly employed for producing a shaped article.

When directly employed, the polymerization solution may be supplemented with an inorganic salt, for example, calcium chloride, which effectively prevents a deposition of the copolymer, and a whitening of the resultant shaped article caused by the deposition of the copolymer.

Also, the polymerization solution should be employed under conditions whereby the undesirable whitening of the resultant shaped article is prevented.

The pulp-like copolymer resin can be directly converted to a shaped article by a compression molding method. Also, the solution of the copolymer in an organic solvent can be converted, into a shaped article, for example, film, by a solution-spreading method, casting method, or wet film-forming method, or into filaments by a wet-spinning method.

In the wet spinning or film-forming method, the dope solution of the copolymer in a solvent is formed into filaments or a film, the shaped dope-solution is brought into contact with a coagulating liquid preferably comprising a mixture of water, which is a non-solvent for the copolymer, and an organic solvent compatible with the copolymer, to provide a coagulated copolymer filament or film.

The resultant filament or film is washed with water, and if necessary, drawn at a predetermined draw ratio, of, for example, 1.5 to 30, and heat-treated at a temperature of, for example, 250° C. to 600° C. for 1/20 second to 5 seconds.

The wholly aromatic polyamide copolymer of the present invention exhibits a high solubility in a widely-used polymerization medium causing no or little harm to the human body, and thus can be easily produced in the medium.

Also, the wholly aromatic polyamide copolymer of the present invention is useful for forming filaments, films sheet, and other articles having a high mechanical strength, a proper modulus of rigidity, and enhanced chemical and heat resistances.

The copolymer shaped articles are useful as reinforcing materials for rubber articles, ropes cords, and resin-reinforcing materials.

EXAMPLES

The present invention will be further illustrated by way of specific examples, which are merely representative and do not restrict the scope of the present invention in any way.

In the examples, the logarithmic viscosity number (inherent viscosity number, $h_{inh}$) of the polymer was determined in a concentration of 0.5 g/100 ml in a solvent consisting of a 98% by weight concentrated sulfuric acid at a temperature of 30° C.

Also, the solubility of the copolymer in a polymerization medium was evaluated into the following three classes.

| Class | Item |
|---|---|
| 3 | No deposition of copolymer found throughout polymerization procedure |
| 2 | Copolymer deposition found only at final stage of polymerization procedure |
| 1 | Copolymer deposition found at initial or middle stage of polymerization procedure. |

EXAMPLE 1 AND COMPARATIVE EXAMPLE 1

In Example 1, a completely dried three-necked flask equipped with a stirrer was charged with a mixture consisting of 1891.83 parts by weight of N-methyl pyrrolidone (NMP), 36.358 parts by weight (40 molar%) of o-tolidine 13.890 parts by weight (30 molar%) of PPDA, and 35.683 parts by weight (30 molar%) of 3,4'-DAPE at room temperature. After the o-tolidine, PPD and 3,4'-DAPE were dissolved in NMP in a nitrogen gas atmosphere, 86.926 parts by weight of terephthalic acid chloride (TPC) were further mixed to the solution at room temperature while stirring the mixture to copolymerize the TPC with the o-tolidine, PPD and 3,4'-DAPE.

With the lapse of the polymerization time, the viscosity of the polymerization mixture was increased. After the polymerization procedure was carried out at a temperature of 80° C. for 60 minutes, a highly viscous copolymer solution having a very high transparency was obtained.

The polymerization solution was neutralized by adding 139.57 parts by weight of a neutralizing slurry of 22.5% by weight of calcium hydroxide in NMP.

The resultant copolymer was collected by deposition from the copolymer solution, and this copolymer had a logarithmic viscosity number ($h_{inh}$) of 4.81.

The copolymer (aramid) solution was charged into a spinning cylinder having a cap with 25 spinning holes each having a diameter of 0.17 mm, and extruded from the spinning cap located 10 mm above the liquid surface of a coagulating liquid through the spinning holes into the coagulating liquid consisting of an aqueous solution containing 30% by weight of NMP, by a dry-jet spinning method.

The resultant copolymer filaments were washed with water and dried, and the dried filaments were drawn in two steps on a first heating plate at a temperature of 300° C. and then on a second heating plate at a temperature of 520° C., at a total draw ratio of 12.8. The resultant drawn filament yarn had a total denier of 35.

The filament yarn had a tensile strength of 27.4 g/d, an ultimate elongation of 3.0%, and a modulus of rigidity of 970 g/d.

In Comparative Example 1, the same procedures as in Example 1 were carried out except that no o-tolidine was used. The resultant copolymer solution had a high transparency.

The copolymer solution in NMP was subjected to the same spinning and drawing procedures as mentioned in Example 1, except that the total draw ratio was 14.0.

The resultant filament yarn had a total denier of 32, a tensile strength of 23.2 g/d, an ultimate elongation of 3.5%, and a modulus of rigidity of 620 g/d.

The mechanical properties of the copolymer filament yarn of Example 1 were superior to those of Comparative Example 1.

EXAMPLE 2

The same procedures as described in Example 1 were carried out with the following exceptions.

A copolymer was prepared from an aromatic diamine component consisting of 52.491 parts by weight (60 molar%) of o-tolidine, 8.913 parts by weight (20 molar%) of PPDA and 16.503 parts by weight (20 molar%) of 3,4'-DAPE and an aromatic dicarboxylic acid component consisting of 83.665 parts by weight of TPC by copolymerizing these components at room temperature for 60 minutes and then at a temperature of 80° C. for 60 minutes.

With the lapse of the polymerization time, the viscosity of the polymerization system was increased. The polymerization system exhibited a high transparency and no deposition of the resultant copolymer was found throughout the polymerization procedures.

After the completion of the polymerization procedures, 134.337 parts by weight of a NMP slurry containing 22.5% by weight of calcium hydroxide was added to the polymerization solution to neutralize same.

The resultant copolymer collected from the resultant polymerization solution by deposition, exhibited a logarithmic viscosity number $h_{inh}$ of 5.46.

The filament yarns produced from the copolymer in the same manner as in Example 1, except that the total draw ratio was 8.45, had a total denier of 53 and exhibited a tensile strength of 23.6 g/d, an ultimate elongation of 2.4%, and a modulus of rigidity of 980 g/d.

EXAMPLE 3

The same procedures as in Example 1 were carried out except that the first drawing temperature was 300° C., the second drawing temperature was 530° C., and the total draw ratio was 7.59.

The resultant copolymer filament yarn had a total denier of 59 and exhibited a tensile strength of 20.0 g/d, an altimate elongation of 2.1%, and a modulus of rigidity of 945 g/d.

EXAMPLE 4

The same procedures as in Example 1 were carried out with the following exceptions.

The copolymer was prepared by mixing 18.916 parts by weight (20 molar%) of o-tolidine, 10.271 parts by weight (40 molar%) of PPDA and 35.683 parts (40 molar%) of 3,4'-DAPE with 1887.44 parts by weight of NMP, dissolving the above-mentioned diamine compounds in NMP at room temperature, adding 90.271 parts by weight of TPC to the diamine solution while vigorously stirring the polymerization solution, and subjecting the polymerization solution to polymerization procedures at room temperature for 60 minutes and then at a temperature of 80° C. for 60 minutes.

The resultant polymerization solution was highly viscous and transparent, and the resultant copolymer exhibited a logarithmic viscosity number of 3.78. The total draw ratio was 22.4.

The resultant copolymer filament yarn had a total denier of 20 and exhibited a tensile strength of 25.2 g/d, an ultimate elongation of 3.1%, and a modulus of rigidity of 890 g/d.

EXAMPLES 5 TO 11 AND REFERENTIAL EXAMPLES 1 TO 5

In each of Examples 5 to 11 and Referential Examples 1 to 5, the same procedures as those described in Example 1 were carried out except that the o-tolidine, PPDA and 3,4'-DAPE in the aromatic diamine component were employed in the molar proportions as indicated in Table 1.

The logarithmic viscosity and solubility of the resultant copolymer are shown in Table 1.

In Referential Examples 1 to 5, the molar proportions of o-tolidine, PPDA and 3,4'-DAPE fell outside of the polygonal diagram CDEFGHI indicated in FIG. 1.

TABLE 1

| Example No. | Molar % | | | Copolymer | |
|---|---|---|---|---|---|
| | (A-1) o-tolidine | (B) PPDA | (C) 3,4'-DAPE | Solubility in NMP | $\eta_{inh}$ |
| Example 5 | 75 | 20 | 5 | 3 | 6.32 |
| Example 6 | 50 | 40 | 10 | 3 | 5.18 |
| Example 7 | 40 | 45 | 15 | 3 | 4.93 |
| Example 8 | 30 | 50 | 20 | 3 | 5.02 |
| Example 9 | 20 | 50 | 30 | 3 | 4.53 |
| Example 10 | 10 | 50 | 40 | 3 | 4.12 |
| Example 11 | 30 | 20 | 50 | 3 | 3.72 |
| Referential Example 1 | 85 | 5 | 10 | 2 | 3.42 |
| Referential Example 2 | 40 | 50 | 10 | 1 | 1.83 |
| Referential Example 3 | 40 | 55 | 5 | 1 | 2.02 |
| Referential Example 4 | 20 | 56 | 24 | 1 | 1.56 |
| Referential Example 5 | 15 | 60 | 25 | 1 | 1.63 |

EXAMPLE 12

The same procedures as in Example 1 were carried out with the following exceptions.

The o-tolidine was replaced by m-tolidine.

The resultant polymerization solution was transparent and no deposition of the resultant copolymer was found throughout the polymerization procedures.

The resultant copolymer had logarithmic viscosity number ($h_{inh}$) of 4.34. The total draw ratio was 20.8.

The resultant copolymer filament yarn had a total denier of 19 and exhibited a tensile strength of 18.2 g/d, an ultimate elongation of 2.1%, and a modulus of rigidity of 950 g/d.

EXAMPLE 13

The same procedures as those in Example 2 were carried out with the following exceptions.

The o-tolidine was replaced by m-tolidine.

The resultant polymerization solution was very transparent and no deposition of the resultant copolymer was found throughout the polymerization procedures.

The resultant copolymer had a logarithmic viscosity number ($h_{inh}$) of 5.63. The total draw ratio was 16.3.

The resultant copolymer filament yarn had a total denier of 28 and exhibited a tensile strength of 17.1 g/d, an ultimate elongation of 1.9%, and a modulus of rigidity of 985 g/d.

EXAMPLE 14

The same procedures as in Example 4 were carried out with the following exceptions.

The o-tolidine was replaced by m-tolidine.

The resultant copolymer exhibited a logarithmic viscosity number ($h_{inh}$) of 5.21. The total draw ratio was 23.6.

The resultant copolymer filament yarn had a total denier of 20 and exhibited a tensile strength of 21.3 g/d, an ultimate elongation of 2.2%, and a modulus of rigidity of 890 g/d.

EXAMPLES 15 TO 26 AND REFERENTIAL EXAMPLES 6 TO 9

In each of Examples 15 to 26 and Referential Examples 6 to 9, the same procedures as in Example 12 were carried out except that the m-tolidine, PPDA and 3,4'-DAPE in the aromatic diamine component were employed in the molar proportions as indicated in Table 2.

The logarithmic viscosity number ($h_{inh}$) and the solubility of the resultant copolymer are shown in Table 2.

In Reference Examples 6 to 9, the molar proportions of m-tolidine, PPDA and 3,4'-DAPE fell outside of the polygonal diagram CD'E'F'G' indicated in FIG. 2.

TABLE 2

| Example No. | Molar % | | | Copolymer | |
|---|---|---|---|---|---|
| | (A-2) m-tolidine | (B) PPDA | (C) 3,4'-DAPE | Solubility in NMP | $\eta_{inh}$ |
| Example 15 | 50 | 30 | 20 | 3 | 7.21 |
| Example 16 | 50 | 25 | 25 | 3 | 6.93 |
| Example 17 | 40 | 45 | 15 | 3 | 6.09 |
| Example 18 | 30 | 35 | 35 | 3 | 5.90 |
| Example 19 | 20 | 50 | 30 | 3 | 5.09 |
| Example 20 | 10 | 50 | 40 | 3 | 4.85 |
| Example 21 | 30 | 20 | 50 | 3 | 3.72 |
| Example 22 | 20 | 20 | 60 | 3 | 2.93 |
| Example 23 | 25 | 55 | 20 | 2 | 3.91 |
| Example 24 | 70 | 25 | 5 | 2 | 8.91 |
| Example 25 | 80 | 10 | 10 | 2 | 9.83 |
| Example 26 | 50 | 45 | 5 | 2 | 3.42 |
| Referential Example 6 | 10 | 60 | 30 | 1 | 1.91 |
| Referential Example 7 | 20 | 60 | 20 | 1 | 1.56 |
| Referential Example 8 | 30 | 60 | 10 | 1 | — |
| Referential Example 9 | 75 | 15 | 10 | 1 | — |

EXAMPLE 27

The same procedures as in Example 1 were carried out with the following exceptions.

The aromatic diamine component consisted of 33.534 631by weight (30 molar%) of 3,3'-dichlorobenzidine parts (DCB), 23.687 parts by weight (50 molar%) of PPDA and 17.545 parts by weight (20 molar%) of 3,4'-DAPE and was dissolved in 1888.5 parts by weight of NMP.

The aromatic dicarboxylic acid component consisted of 88,945 parts by weight of TPC.

The neutralization of the resultant polymerization solution was carried out by adding 143.824 parts by weight of the NMP slurry containing 22.5% by weight of calcium hydroxide.

The resultant copolymer had a logarithmic viscosity number ($h_{inh}$) of 3.59.

The two step drawing operation was carried out at a temperature of 300° C. and then at a temperature of 460° C., at a total draw ratio of 9.5.

The resultant copolymer filament yarn had a total denier of 37 and exhibited a tensile strength of 23.8 g/d, an ultimate elongation of 2.6%, and a modulus of rigidity of 910 g/d.

A filament yarn bundle consisting of 100 the filament yarns was placed at a center portion of a copper coil having a diameter of 100 mm and maintained at an angle of 45 degrees from the horizontal level. Then, a flame was brought into contact with the filament yarn bundle. The combustion of the filament yarn bundle was observed by the naked eye, and it was found that the filament yarn bundle was not burnt by the above-mentioned ignition operation. The content of chlorine in the filaments was 7.3% by weight.

For comparison, a filament yarn bundle consisting of poly-p-phenylene terephthalamide (PPTA) filaments was subjected to the same flame test as mentioned above. It was found that the filament yarn bundle having a length of 10 cm was burnt by four ignition operations, and flame was transmitted along the filament yarn bundles.

EXAMPLE 28

The same procedures as in Example 27 were carried out with the following exceptions.

The aromatic diamine component consisted of 33.811 parts by weight (50 molar%) of DCB, 11.449 parts by weight (40 molar%) of PPDA and 5.300 parts by weight (10 molar%) of 3,4'-DAPE'and was dissolved in 1932.7 parts by weight of NMP, and mixed with 53.737 parts by weight of TPC.

The resultant polymerization solution was neutralized with 86.892 parts by weight of the NMP slurry containing 22.5% by weight of calcium hydroxide.

The resultant copolymer had a logarithmic viscosity number ($h_{inh}$) of 3.36.

The total draw ratio was 3.3.

The resultant copolymer filament yarn had a total denier of 73, exhibited a tensile strength of 14.3 g/d, an ultimate elongation of 1.8%, a modulus of rigidity of 890 g/d, and an excellent flame resistance, and contained 11.17% by weight of chlorine.

EXAMPLE 29

The same procedures as in Example 27 were carried out with the following exceptions.

The aromatic diamine component consisted of 48.633 parts by weight (40 molar%) of DCB, 12.022 parts by weight (30 molar%) of PPDA and 22.262 parts by weight (30 molar%) of 3,4'-PAPE'was dissolved in 1905.6 parts by weight of NMP and mixed with 75.289 parts by weight of TPC.

The resultant viscous, transparent polymerization solution was neutralized with 121.73 parts by weight of the NMP slurry containing 22.5% by weight of calcium hydroxide.

The resultant copolymer had a logarithmic viscosity number of 2.30.

The total draw ratio was 22 0.

The resultant copolymer filament yarn had a total denier of 29 and a chlorine content of 8.9% by weight and exhibited a tensile strength of 12.5 g/d, an ultimate elongation of 2.0%, a modulus of rigidity of 790 g/d, and an excellent flame-retardant property.

EXAMPLE 30

The same procedures as in Example 27 were carried out with the following exceptions.

An aromatic diamine component consisting of 37.709 parts by weight (60 molar%) of DCB, 5.320 parts by weight (20 molar%) of PPDA and 9.852 parts by weight (20 molar%) of 3,4-DAPE was dissolved in a mixed polymerization medium consisting of 1937.4 parts by weight of NMP and 19.374 parts by weight of a solubility-enhancing agent consisting of calcium chloride and dissolved in the NMP, and then mixed with 49.944 parts by weight of TPC.

With a lapse of the polymerization time, the viscosity of the polymerization solution was increased and the resultant polymerization solution was slightly muddy and colored light yellow.

The resultant polymerization solution was neutralized with 80.759 parts by weight of the NMP slurry containing 22.5% by weight of calcium hydroxide.

The resultant copolymer had a logarithmic viscosity number of 3.83.

The two step drawing operation was carried out at a temperature of 300° C. and then at a temperature of 440° C., at a total draw ratio of 2.50.

The resultant copolymer filament yarn had a total denier of 90 and a chlorine content of 11.2% by weight and exhibited a tensile strength of 17.3 g/d, an ultimate elongation of 1.8%, a modulus of rigidity of 830 g/d, and an excellent flame retardant property.

EXAMPLE 31

The same procedures as in Example 27 were carried out with the following exceptions.

The aromatic diamine component consisted of 5 molar% of DCB, 45 molar% of PPDA, and 50 molar% of 3,4'-DAPE.

The resultant copolymer had a logarithmic viscosity number of 3.56.

The two step drawing operation was carried out at a temperature of 300° C. and then at a temperature of 490° C., at a total draw ratio of 20.0.

The resultant copolymer filament yarn had a total denier of 33 and a chlorine content of 1.3% by weight, and exhibited a tensile strength of 23.5 g/d, an ultimate elongation of 3.9%, a modulus of rigidity of 780 g/d and a satisfactory flame retardant property such that, to burn the filament yarn bundle having a length of 10 cm, 12 ignition operations were necessary.

EXAMPLES 32 TO 38 AND REFERENTIAL EXAMPLES 10 TO 14

In each of Examples 32 to 38 and Referential Examples 10 to 14, the same procedures as in Example 27 were carried out except that DCB, PPDA and 3,4'-DAPE were employed in the molar proportions as indicated in Table 3.

The solubility and logarithmic viscosity number of the resultant copolymer are shown in Table 3.

In Referential Examples 10 to 14, the molar proportions of DCB, PPDA and 3,4'-DAPE fell outside of the polygonal diagram CD"E"F"G"H" as indicated in FIG. 3.

TABLE 3

| | Item | | | | |
|---|---|---|---|---|---|
| | Molar % | | | Copolymer | |
| Example No. | (A-3) DCB | (B) PPDA | (C) 3,4'-DAPE | Solubility in NMP | $\eta_{inh}$ |
| Example 32 | 10 | 60 | 30 | 3 | 2.90 |
| Example 33 | 20 | 40 | 40 | 3 | 3.81 |
| Example 34 | 20 | 50 | 30 | 3 | 2.81 |
| Example 35 | 20 | 60 | 20 | 3 | 2.84 |
| Example 36 | 40 | 50 | 10 | 2 | 3.22 |
| Example 37 | 50 | 25 | 25 | 2 | 2.30 |

TABLE 3-continued

| Example No. | Molar % (A-3) DCB | Molar % (B) PPDA | Molar % (C) 3,4'-DAPE | Copolymer Solubility in NMP | $\eta_{inh}$ |
|---|---|---|---|---|---|
| Example 38 | 60 | 35 | 5 | 2 | 2.01 |
| Referential 10 Example | 70 | 0 | 30 | 1 | — |
| Referential 11 Example | 70 | 15 | 15 | 1 | — |
| Referential 12 Example | 10 | 70 | 20 | 1 | — |
| Referential 13 Example | 30 | 60 | 10 | 1 | — |
| Referential 14 Example | 10 | 75 | 25 | 1 | — |

EXAMPLE 39

A completely dried three-necked flask equipped with a stirrer was charged with 2851.6 parts by weight of N-methyl pyrolidone (NMP), and then with 74.316 parts by weight of 3,3'-dimethyl benzidine (3,3'-DMB) and 46.7306 parts by weight of 3,4'-diaminodiphenylether 3,4'-DAPE). After the 3,3'-DMB and 3,4'-DAPE were dissolved in NMP, 118.454 parts by weight of terephthalic acid chloride (TPC) were added with a single operation to the resultant solution while vigorously stirring at room temperature, and the resultant mixture was subjected to a polymerization procedure in a nitrogen gas atmosphere.

With the lapse of the polymerization time, the viscosity of the polymerization mixture was increased. After the polymerization procedure was carried out at room temperature for one hour and then at a temperature of 80° C. for one hour, 191.541 parts of weight of a NMP slurry containing 22.6% by weight of calcium hydroxide were added to neutralize the resultant copolymer solution.

A portion of the copolymer solution was mixed to water while applying a shearing force thereto to allow the copolymer to deposit in the form of fibrils.

The resultant copolymer had a logarithmic viscosity number of 3.31.

The remaining light yellow copolymer solution was charged into a spinning cylinder having a spinneret with 25 spinning holes each having a diameter of 0.3 mm while maintaining at a temperature of 60° C., and extruded from the spinning holes into a coagulating liquid consisting of an aqueous solution of 30% by weight of NMP through an air gap having a length of 10 mm, by a dry-jet spinning method.

The resultant copolymer filaments were washed with water and dried, and the dried filaments were drawn in two steps on a first heating plate at a temperature of 300° C. and then on a second heating plates at a temperature of 470° C., at a total draw ratio of 2.5, and heat-set. The resultant drawn filament yarn had a total denier of 130.

The filament yarn had a tensile strength of 9.2 g/d, an ultimate elongation of 1.0% and a modulus of rigidity of 840 g/d, and thus exhibited a high mechanical strength and rigidity.

EXAMPLE 40

The same procedures as those described in Example 39 were carried out with the following exceptions.

To prepare a polymerization mixture, 69.7612 parts by weight of 3,3'-dichlorobenzidine (3,3'-DCB), and 55.1824 parts by weight of 3,4'-DAPE were dissolved in 2860.0 parts by weight of NMP at room temperature and then the resultant solution was supplemented with 111.903 parts by weight while stirring. The molar ratio of 3,3'-DCB to 3,4'-DAPE was 50:50. The polymerization mixture was subjected to polymerization procedures at room temperature for 60 minutes and then at a temperature of 80° C. for 60 minutes.

With the lapse of the polymerization time, the viscosity of the polymerizaition mixture was increased while the polymerization mixture exhibited high transparency and no deposition of the resultant copolymer was found.

The resultant copolymer solution was neutralized by gradually adding 180.947 parts of the same calcium hydroxide -NMP slurry as mentioned in Example 39.

The resultant copolymer exhibit a logarithmic viscosity number of 2.30.

The copolymer filaments prepared in the same dry-jet spinning manner as in Example 1 were drawn at two steps at a temperature of 300° C. and then at a temperature of 480° C., at a total ratio of 4.8. The drawn filament yarn had a total denier of 88.

The drawn copolymer filament yarn was rigid and exhibited tensile strength of 13.2 g/d, an ultimate elongation of 1.6% and a modulus of rigidity of 840 g/d.

Also, the copolymer filament yarn exhibited a high flame resistance.

EXAMPLE 41

The same procedures as in Example 39 were carried out except that the molar ratio of 3,3'-DMB to 3,4'-DAPE was 50:50, the resultant copolymer had a logarithmic viscosity number of 3.01, the drawing was carried out in two steps at 300° C. and then at 520° C., and the resultant drawn copolymer filament yarn had a total dinier of 7.7 and exhibited a tensile strength of 7.9 g/d, an ultimate elongation of 1.0 % and a modulus of elasticity of 780 g/d.

EXAMPLE 42

The same procedures us in Example 40 were carried out with the following exceptions.

The molar ratio of 3,3'-DCB to 3,4'-DAPE was 40:60. The resultant copolymer had a logarithmic viscosity number of 2.65. The two step drawing procedure was carried out at a temeprature of 300° C. and then at 460° C., at a total draw ratio of 5.2. The resultant drawn copolymer filament yarn had a total denior of 85 and exihibited a tensile strength of 12.9 g/d, an ultimate elongation of 1.7 % and a modulus of rigidity of 820 g/d.

EXAMPLE 43

The same procedures as in Example 39 were carried out with the following exceptions.

The polymerization mixture was prepared by dissolving 28.8209 parts by weight of 3,3'-DCB, 48.3414 parts by weight of 3,3'-DMB and 46.1542 parts by weight of 3,4'-diaminophenylether (3,4'-DAPE), the molar ratio of 3, 3'-DCB to 3,3'-DMB and 3,4'-DAPE being 20:40:40, in 4355.2 parts by weight of NMP, at room temperature and adding 115.578 parts by weight of TPC to the solution.

The neutralizing slurry of 22.5% by weight of calcium hydroxide in NMP was employed in an amount of 186.89 parts by weight to complete the polymerization procedure.

The resultant copolymer had a logarithmic viscosity number of 2.98.

The two step drawing procedure was carried out at a temperature of 300° C. and then at 480° C., at a total draw ratio of 3.2. The resultant copolymer filament yarn had a total denier of 131 and exhibited a tensile strength of 9.2 g/d, an ultimate elongation of 1.2%, and a modulus of rigidity of 820 g/d.

EXAMPLES 44 to 52

In each of Examples 44 to 52, the same procedures as in Example 39 were carried out except that the aromatic diamine moiety consisting of the types of the compound in the amount as those shown in Table 4 per 100 parts by weight of TPC was used.

The logarithmic viscosity number of the resultant copolymer, the second drawing temperature and the draw ratio and the total denier and properties of the resultant drawn copolymer filament yarn are shown in Table 4.

wherein X represents a halogen atom, m and n represent, respectively and independent from each other, zero or an integer of 1 to 4, wherein

TABLE 4

| | Composition of copolymer (molar %) | | | | | Copolymer $\eta$inh | Drawing | | Filament Yarn | | | |
|---|---|---|---|---|---|---|---|---|---|---|---|---|
| | Dicarboxylic acid | Diamine | | | | | Temperature (°C.) | Draw ratio | Denier (g/d) | Tensile strength (g/d) | Ultimate elongation (%) | Modulus of rigidity (g/d) |
| Example | TPC | DMB | DCB | DBB | DMOB | DAPE | | | | | | | |
| 44 | 100 | 50 | 10 | — | — | 40 | 3.30 | 500 | 2.9 | 159 | 10.1 | 1.1 | 1030 |
| 45 | 100 | 40 | — | 20 | — | 40 | 3.03 | 480 | 4.2 | 121 | 10.3 | 1.1 | 890 |
| 46 | 100 | 0 | 0 | 40 | — | 60 | 3.01 | 480 | 5.2 | 83 | 13.1 | 1.2 | 930 |
| 47 | 100 | 0 | — | — | 60 | 40 | 2.90 | 480 | 2.7 | 138 | 93 | 1.3 | 820 |
| 48 | 100 | 30 | — | — | 30 | 40 | 2.93 | 480 | 3.3 | 129 | 9.9 | 1.2 | 890 |
| 49 | 100 | 30 | — | — | — | 70 | 2.71 | 470 | 3.9 | 120 | 6.3 | 1.8 | 720 |
| 50 | 100 | 0 | 30 | — | — | 70 | 2.81 | 480 | 3.3 | 126 | 6.4 | 1.4 | 690 |
| 51 | 100 | 15 | — | — | — | 85 | 2.30 | 450 | 4.0 | 125 | 5.0 | 2.3 | 400 |
| 52 | 100 | 5 | 10 | — | — | 85 | 2.51 | 450 | 3.9 | 120 | 6.1 | 1.9 | 420 |

Note:
TPC: Terephthalic acid chloride
DMB: 3,3'-dimethylbenzidine
DCB: 3,3'-dichlorobenzidine
DBB: 3,3'-dibromobenzidine
DMOB: 3,3'-dimethoxybenzidine
DAPE: 3,4'-diaminodiphenylether
The drawing procedure was carried out in two steps at a temperature of 300° C. and then at the temperature as indicated in Table 4.

We claim:

1. A wholly aromatic polyamide copolymer comprising:

an aromatic dicarbonyl moiety consisting of repeating units of the formula:

—CO—⟨○⟩—CO— and
an aromatic diamine moiety comprising:
(A) at least one repeating unit selected from the group consisting of (A-1), (A-2) and (A-3), of the formulae:

(A-1)
—NH—⟨○⟩—⟨○⟩—NH—
       H₃C      CH₃

(A-2)
        CH₃
—NH—⟨○⟩—⟨○⟩—NH—
              H₃C and (A-3)
—NH—⟨○⟩—⟨○⟩—NH—
       Xm      Xn the sum of m and n is 1 to 8.

—NH—⟨○⟩—NH— and
(C) repeating units of the formula:

—NH—⟨○⟩—O—⟨○⟩—NH—

2. The copolymer as claimed in claim 1, wherein the repeating units (A) are the repeating units (A-1), and when indicated in a triangular coordinate, the molar proportions of the repeating units (A-1), (B) and (C) in the aromatic diamine moiety are on or within a polygonal diagram defined by the coordinates C, D, E, F, G, H, and I, except for a line defined by the coordinates C and I, which coordinates are defined as follows:

3. The copolymer as claimed in claim 2, wherein the molar proportions of the repeating units (A-1), (B) and (C) are on or within a polygonal diagram defined by the coordinates E, F, G, H, J, K, and L which are defined as follows:

| Coordinate | Molar % of repeating units | | |
|---|---|---|---|
| | (A-1) | (B) | (C) |
| C | 0 | 0 | 100 |
| D | 80 | 0 | 20 |
| E | 80 | 15 | 5 |
| F | 55 | 40 | 5 |
| G | 25 | 55 | 20 |
| H | 5 | 55 | 40 |
| I | 0 | 55 | 45 |

3. The copolymer as claimed in claim 2, wherein the molar proportions of the repeating units (A-1), (B) and (C) are on or within a polygonal diagram defined by the coordinates E, F, G, H, J, K, and L which are defined as follows:

| Coordinate | Molar % of repeating units | | |
|---|---|---|---|
| | (A-1) | (B) | (C) |
| E | 80 | 15 | 5 |
| F | 55 | 40 | 5 |
| G | 25 | 55 | 20 |
| H | 5 | 55 | 40 |
| J | 5 | 25 | 70 |
| K | 25 | 5 | 70 |
| L | 80 | 5 | 15 |

4. The copolymer as claimed in claim 1, wherein the repeating units (A) are the repeating units (A-2), and when indicated in a triangular coordinate, the molar proportions of the repeating units (A-2), (B) and (C) in the aromatic diamine moiety are on or within a polygonal diagram defined by the coordinates C, D', E', F' and G', except for a line defined by the coordinates C and G', which coordinates are defined as follows:

| Coordinate | Molar % of repeating units | | |
|---|---|---|---|
| | (A-2) | (B) | (C) |
| C | 0 | 0 | 100 |
| D' | 80 | 0 | 20 |
| E' | 80 | 20 | 0 |
| F' | 40 | 60 | 0 |
| G' | 0 | 60 | 40 |

5. The copolymer as claimed in claim 4, wherein the molar proportions of the repeating units (A-2), (B) and (C) are on or within a polygonal diagram defined by the coordinates H', I', J', K', L', and M' which are defined as follows:

| Coordinate | Molar % of repeating units | | |
|---|---|---|---|
| | (A-2) | (B) | (C) |
| H' | 10 | 30 | 60 |
| I' | 30 | 10 | 60 |
| J' | 60 | 10 | 30 |
| K' | 60 | 30 | 10 |
| L' | 40 | 50 | 10 |
| M' | 10 | 50 | 40 |

6. The copolymer as claimed in claim 1, wherein the repeating units (A) are the repeating units (A-3), and when indicated in a triangular coordinate, the molar proportions of the repeating units (A-3), (B) and (C) in the aromatic diamine moiety are on or within a polygonal diagram defined by the coordinates C, D'', E'', F'', G'' and H'', except for a line defined by the coordinates C and H'', which coordinates are defined as follows:

| Coordinate | Molar % of repeating units | | |
|---|---|---|---|
| | (A-3) | (B) | (C) |
| C | 0 | 0 | 100 |
| D'' | 65 | 0 | 35 |
| E'' | 65 | 30 | 5 |
| F'' | 45 | 50 | 5 |
| G'' | 15 | 65 | 20 |
| H'' | 0 | 60 | 40 |

7. The copolymer as claimed in claim 1 or 6, wherein the repeating units (A-3) have a chlorobenzidine structure.

8. The copolymer as claimed in claim 1, wherein the repeating units (A-3) have a 3,3'-dichlorobenzidine structure.

9. A shaped article comprising the wholly aromatic polyamide copolymer as claimed in claim 1.

10. The copolymer as claimed in claim 6, wherein the repeating units (A-3) have a 3,3'-dichlorobenzidine structure.

* * * * *